(12) United States Patent
Verboom

(10) Patent No.: US 6,487,146 B1
(45) Date of Patent: Nov. 26, 2002

(54) READ FOCUS OPTIMIZATION FOR AN OPTICAL DISK DRIVE

(75) Inventor: Johannes J. Verboom, Colorado Springs, CO (US)

(73) Assignee: Plasmon LMS Inc., Colorado Springs, CO (US)

( * ) Notice: Subject to any disclaimer, the term of this patent is extended or adjusted under 35 U.S.C. 154(b) by 0 days.

(21) Appl. No.: 09/523,891

(22) Filed: Mar. 13, 2000

(51) Int. Cl.$^7$ .................................................. G11B 7/00
(52) U.S. Cl. .................................. 369/44.25; 369/53.28
(58) Field of Search ........................... 369/44.27, 44.29, 369/44.34, 44.35, 44.25, 44.26, 53.18

(56) References Cited

U.S. PATENT DOCUMENTS

| | | | |
|---|---|---|---|
| 5,251,194 A | * 10/1993 | Yoshimot etal. | ......... 369/44.25 |
| 5,574,706 A | 11/1996 | Verboom et al. | |
| 5,828,636 A | * 10/1998 | Matsumot et al. | ....... 369/44.27 |
| 6,252,835 B1 | * 6/2001 | Choi | ....................... 369/44.29 |

FOREIGN PATENT DOCUMENTS

JP          8-115521    * 5/1996   .............. 369/44.26

* cited by examiner

*Primary Examiner*—Nabil Hindi
(74) *Attorney, Agent, or Firm*—Oppenheimer Wolff & Donnelly LLP

(57) ABSTRACT

Writing predetermined data pattern to an allocated segment of a disk drive and appropriately reading that one data pattern while varying the read focus characteristics provides for efficient and effective read focus optimization in an optical disk drive. In order to produce helpful data, the read focus offset is varied while reading the different segments of the data pattern, thus producing read out signals with different peak to peak amplitudes. This is compared to data which is obtained by reading the same data pattern while the offset is held constant. Optimization of the read focus offset is carried out and made possible by appropriate analysis of the waveforms produced when reading the predetermined data pattern in these two reading passes. By appropriately tracking the results of the various read focus offsets, an optimum read focus offset can be easily determined.

24 Claims, 5 Drawing Sheets

READ FOCUS OPTIMIZATION FOR AN OPTICAL DISK DRIVE

BACKGROUND OF THE INVENTION

The present invention relates to data storage systems utilizing an optical disk drive. More specifically, the present invention relates to an apparatus and system which optimizes the read focus offset in order to provide optimal focus for a read head in an optical disk drive.

In optical data storage systems, it is necessary to read out data from a data storage media utilizing an optical system. This optical system will detect variations or marks in the data storage media (e.g. an optical disk). These marks are written to the storage media in a meaningful manner and make up the stored data such that accurate retrieval is critical in order to reproduce the stored data.

As expected, the optical system typically includes various lenses and positioning devices which cooperate with one another to provide focusing on the data storage media. The optical characteristics of this system will often change over time thus causing variations in the system operation. These changes can result from a large number of things. Changes in temperature can cause related changes in optical properties, all of which dramatically affect the operation of the system. Further, the optical elements are typically mechanically positioned and aligned. This alignment and positioning can vary as the disk drive itself encounters shock and vibration. All of these misalignments affect the focusing of the read out system, and ultimately affect the performance of the disk drive.

Typically, read out systems include mechanisms which allow some offset to be injected into the focusing control. Often, focusing is controlled by a servo which will drive a focus motor and appropriately position the focusing lens. As is well known, an offset can easily be introduced into this servo system in order to vary the focus operations. Due to the circumstances outlined above, it is necessary to periodically check the focusing operation and insure that optimum focusing parameters are being used.

In addition to variations in the alignment of the focusing system, the actual storage media may not be consistent. Substrate thicknesses in the optical media often change from disk to disk. This requires that the read focus be optimized every time a disk is changed.

While it is possible to optimize the read focus characteristics of the read out system in all appropriate circumstances, lengthy calibration procedures increase the overall spin-up time. As expected, speed is critical in data retrieval systems so a lengthy spin-up time is undesired.

Various methodologies have been used to optimize read focus offset. U.S. Pat. No. 5,574,706 entitled "Focus Offset Optimization For Reading Optically-Recorded Data" describes one such methodology wherein both control marks and reference data marks are recorded in each frame when the disk is initially written. The recorded reference data marks are placed no farther apart than the smallest distance between two successive data marks which must be resolved as a blank space or zero during the read out process. Analyzing the signals produced when reading out these signals, and insuring that the distance between marks can be resolved allows for optimum read focus. This method requires the placement of these reference data marks be recorded in each frame however, thus adding to the complexity of the storage frames. Additionally, a relatively small number of marks are placed in each frame, thus the accuracy of any amplitude measurements is not optimum. Further, high speed focus optimization is not best accomplished using this method.

Further systems have used isolated data sectors which are continually read at different read focus offset levels. This process however is quite time consuming as it requires the same data sector to be read multiple times. Using this methodology, the same data sector is read in order to ensure that variations in media quality and signal characteristics are accounted for. As can be appreciated, however, this process is time consuming. In order to read the same data sector, one complete revolution is required between each reading cycle. Consequently, if samples are to be taken at 30 different focus offset levels, at least 30 revolutions of the disk are required.

It is beneficial to develop a system and process for efficiently optimizing the read focus of an optical storage system. Such an optimum system would be fast, efficient, and would utilize only a small amount of disk space.

SUMMARY OF THE INVENTION

The present invention provides a system and method for read focus optimization which is both efficient and accurate. Further, read focus optimization can be accomplished fairly quickly, thus avoiding long spin up time period.

Prior to the actual process of read focus optimization, the data storage media or disk of the present invention is prewritten with three tracks of data specifically configured for the read focus optimization function. These prewritten tracks are placed at or near the middle radius of the disk, as this area is more representative of the user area than other portions of the disk.

The prewritten tracks of data are made up of data patterns which are chosen to simplify the read focus optimization process. The specific patterns are predominantly or exclusively made up of 3T data patterns of the RLL 1, 7 Code. By using this specific pattern, a focus offset can be determined which provides the maximum peak to peak amplitude when the 3T pattern is read out. Alternatively, the specific data pattern could be predominantly or exclusively a 2T pattern, or some other predetermined data pattern, including a combination of the 3T and 2T patterns.

In order to provide realistic conditions, three parallel tracks of data are written at the center radius, with only the center track including the predetermined data pattern. The two adjacent tracks can be written with any data pattern in order to create interference (cross talk) as is typically with user data. When the data is read for purposes of focus optimization however, only the center track is utilized.

In order to determine the optimum read focus, a specially tailored read function is carried out. In this read process, the above referenced center track of pre-recorded data is read out from the storage media in a specific manner. Also, rather than simply decoding this data and providing decoded data to the data buffer, peak to peak amplitude data is provided. The transferred amplitude data is preconditioned over a few channel bit samples in order to reduce the effects of system noise and media defects.

When reading out this predetermined data pattern, variations in the read focus are made. As is well known, the focus motor includes a servo control. Variations in read focus is accomplished by injecting offsets into this servo control at various points throughout the read process. More specifically, the focus offset is varied in a predetermined manner so that predetermined offsets are used in various sectors. In one embodiment of the present invention, the read focus offset starts at a maximum value and is decremented through a predetermined range. This predetermined range is established by factory default settings established by the manufacturer. After all the data is collected, an average 3T amplitude can then be calculated for each data sector.

In order to quickly perform read focus optimization, the read function actually utilizes two separate read passes. In the first pass no variable read focus offset is used. In the second pass, the same track is read while the offset is varied as mentioned above. Based on these two read passes, an amplitude variation can then be determined for each data sector. Specifically, the 3T peak to peak amplitude from the first pass is compared with the 3T peak to peak amplitude from the second pass for each data sector. The data sector with the largest positive difference is determined to have the optimal focus offset, and provides an optimum offset setting for the read focus servo system. This focus offset can then be used when user data is read. This process is efficiently carried out as only two revolutions of the disk are required.

As can be seen from the details outlined above, the system and process of the present invention accomplishes read focus optimization utilizing only three data tracks in the center of the optical disk. Consequently, the remainder of the area is available for user data writing. This provides for efficient use of the data media. Also, the read focus optimization process can be quickly carried out, thus reducing the initialization or spin-up time required for the disk.

It is an object of the present invention to provide a method of optimizing the read focus of an optical storage system which minimizes media consumption. That is, the process does not utilize large amounts of storage media simply for the read focus optimization process.

It is a further object of the present invention to provide a method and system for carrying out read focus optimization which is relatively fast and efficient.

It is a further object of the present invention to utilize a prewritten track of read focus data which includes predetermined data patterns when carrying out read focus optimization.

BRIEF DESCRIPTION OF THE DRAWINGS

Further objects and advantages of the present invention can be seen by reviewing the following detailed description in conjunction with the drawings in which.

DETAILED DESCRIPTION OF PREFERRED EMBODIMENTS

Figure 1:
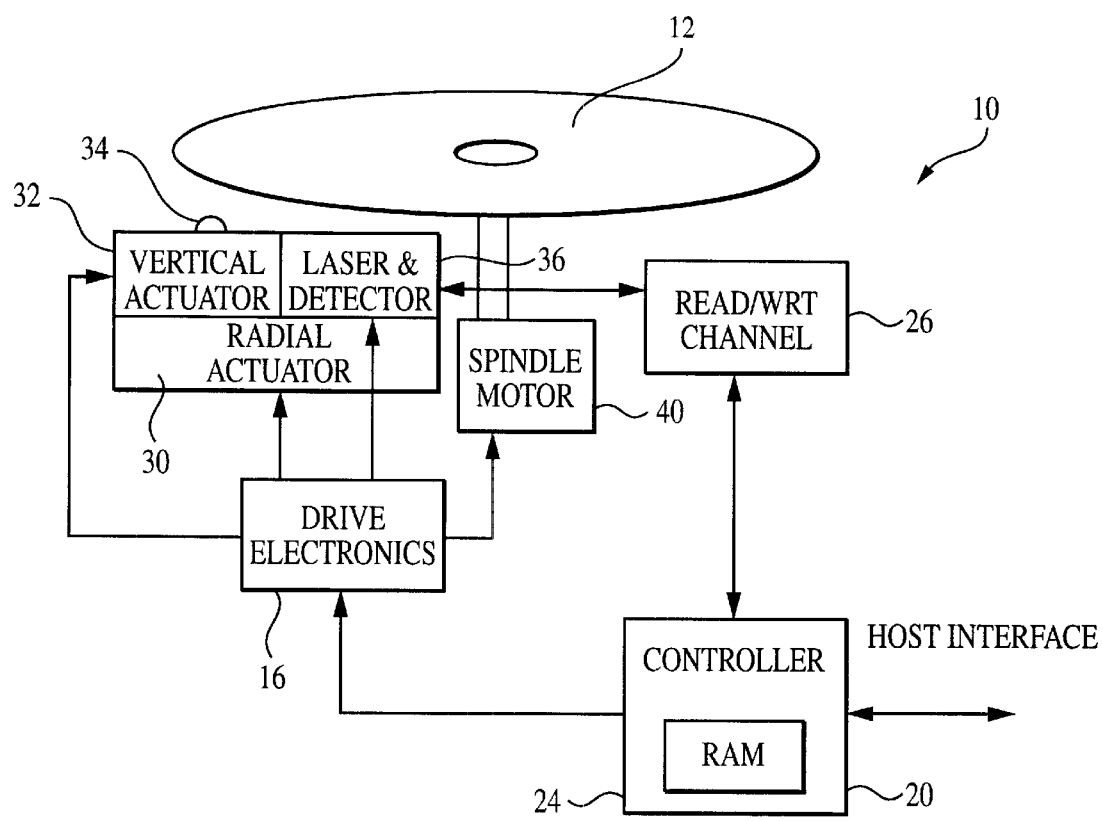
FIG. 1 is a schematic diagram illustrating the disk control system of the present invention.

Referring now to FIG. 1, there is shown a schematic diagram of the disk storage system 10 which must periodically perform the read focus optimization process outlined below. The core component of storage system 10 is an optical media 12. This optical media 12, could include an optical disk however is not necessarily limited to that type of device. Disk storage system 10, necessarily has a read/write system 14 incorporated therein for writing data to the optical media 12, and reading data therefrom. Storage system 10 further includes drive electronics 16 for operating the functions of the drive. Also associated is a drive controller 20 which includes a memory or RAM 24. Interacting with the output from read/write head 14 is a read/write channel 26 which necessarily includes an internal decoder (now shown). Read/write channel 26 is capable of producing either decoded or nondecoded data and providing this data to controller 20. Controller 20 also communicates with a host system (not shown) to respond to its data storage and retrieval needs.

It will be understood that many variations could be incorporated into this component hardware. Also, many additional functions may be undertaken by controller 20 or may be controlled by other components.

Read/write head 14 includes various components which are necessary for its operation. Specifically, a radial actuator 30 is included for accommodating radial motion for read/write system 14. Also, a vertical actuator 32 is included to move appropriate components closer to the surface of optical media 12 when necessary. Vertical actuator 32 may also be referred to as a focus motor as it typically moves a focusing lens 34 into its optimum position. Lastly, read/write system 14 includes a laser and detector 36 for appropriately producing optical signals for use in either writing or reading to the optical media. Additionally, this laser and detector system cooperates with the light signals produced to detect data which has already been written to optical media 12.

Also included in storage system 10 is a spindle motor 40 for controlling the rotational movement of optical media 12. Drive electronics 16 cooperate with all of these components to appropriately coordinate their functions and provide reading and writing capabilities.

The vertical actuator 32 or focus motor, is typically a servo controlled system for accurately positioning focusing lens 34. As is well known, it is always possible to insert an offset signal into any servo loop, thus forcing the control points to vary. In the case of vertical actuator 32, this offset will cause focusing lens 34 to be moved to various positions. Stated alternatively, the offset is used to make minor adjustments to positioning in order to achieve optimum performance. As outlined above, it is the goal of this invention to optimize this lens positioning in order to achieve the most efficient and reliable read out.

Figure 2:
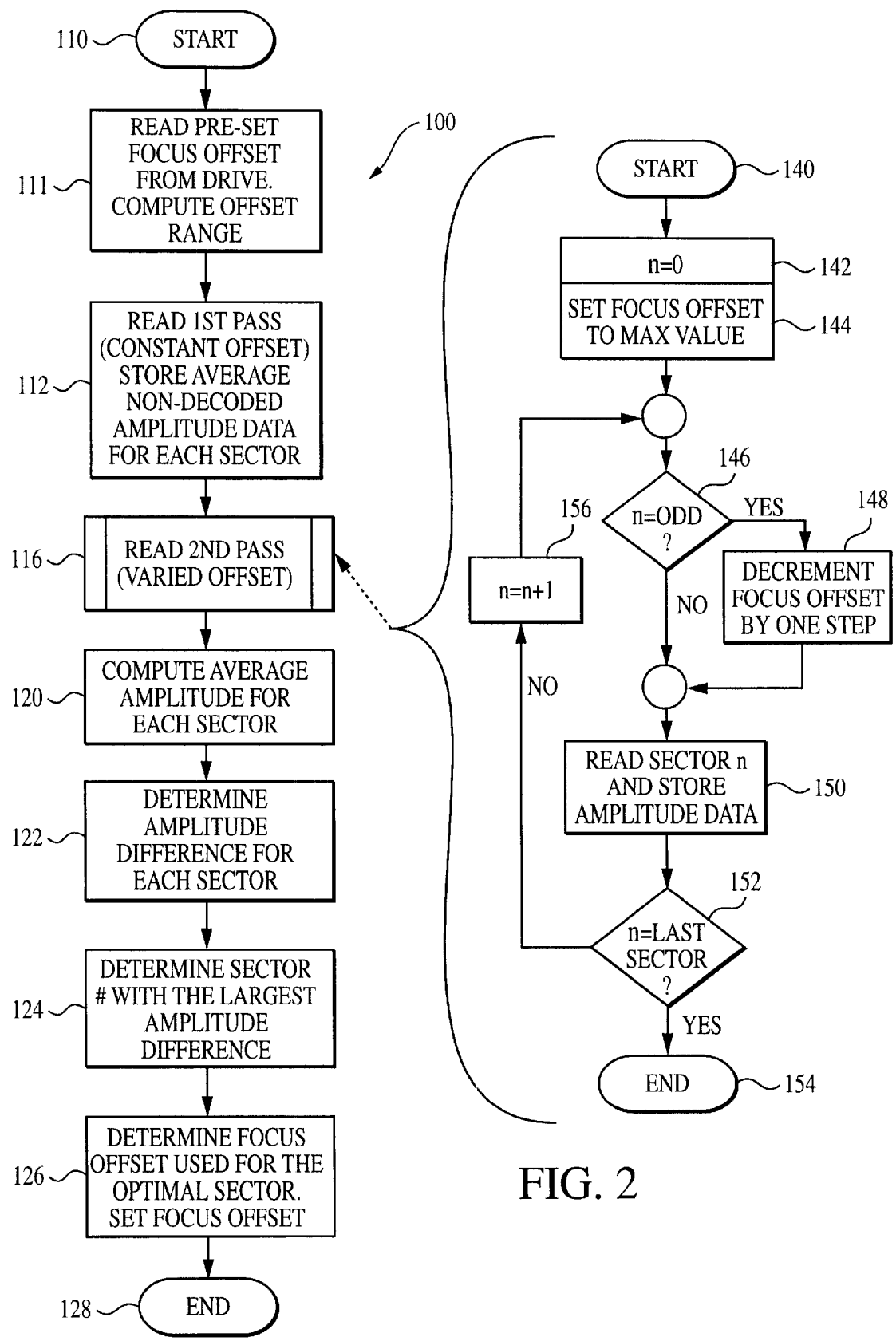
FIG. 2 is a flow chart illustrating the process of read focus optimization of the present invention.

Referring now to FIG. 2, there is shown a flow chart outlining the read focus optimization process 100 of the present invention. As can be seen, this process starts at step 110 which is typically initiated during an initialization or read process of the disk drive. In the first process step, 111, the pre-set focus offset is read from the drive. This is a parameter set by the drive manufacturer and will vary for each drive. Based on this pre-set focus offset, the controller can compute a desired offset range. Next, in step 112, the prewritten data pattern is first read in its entirety. During this first read step, or pass, the read focus is maintained at the pre-set focus offset. Alternatively, any constant value could be used.

As further described below, the prewritten data pattern or RFO data set will occupy three allocated tracks at the center of the disk. The center tracks were chosen because they more accurately represent user data sections. Further, these particular data sectors are typically free of defects and surface variations that are typically encountered near the edges of a disk. The three data tracks consist of one predetermined pattern or data set, and two adjacent data patterns. The two adjacent patterns can be random and are not specifically used in the read focus optimization process. These adjacent tracks do create cross talk and interference however, thus help to accurately simulating a typical read operation.

During the first read pass in step 112, an average non-decoded amplitude data value is determined for each sector of the RFO data set. This non-decoded amplitude data is stored in a data buffer and will be used in later steps to analyze the actual read focus of the read/write head. As mentioned above in reference to step 112, the focus offset for the first read pass is maintained constant. Consequently this first set of amplitude data provides a base line upon which further comparisons can be made.

Next, in step 116 the read focus data pattern is read for a second time. In this second read pass however, the offset is varied. This variable offset reading process, used in the second pass, is further described and shown in FIG. 2 as steps 140 through 154.

Starting at step 140 the variable offset reading process is started. Next, the system moves to step 142 where a counter, n, is set to zero. This counter will be used to track the reading of various data sectors throughout the predetermined data pattern and essentially identifies the sector being read. Next, in step 144 the read focus offset is set to its maximum value. This maximum value was previously calculated in step 112 based upon information from the disk manufacturer.

In step 146 the system asks if counter value n is odd. If the value is odd (indicating that an odd sector will be read) the process moves to step 148 where the read focus offset is decremented by one step. Next, in step 150, data sector n is read and the non-decoded amplitude data is stored. If it was determined that n was even, (in step 146) the reading process of step 150 is also initiated. Again, this involves providing non-decoded amplitude data to a data buffer for further analysis. Following the reading of sector n, the system determines whether sector n is the last data sector in step 152. If this is the last data sector, the process then moves to step 154 wherein the reading of the second pass is complete. Alternatively, if sector n is not the last data sector, the process moves to step 156 where the counter n is incremented by 1, and then back to step 146 wherein the system again determines if it is reading an odd or even sector. Subsequently, the process will go through steps 146 (odd/even determination), step 148 (vary offset), and step 150 (read sector n) until the entire track of read focus data has been read.

In summary, the variable offset reading process outlined in steps 140 through 156 switches the read focus offset prior to reading each odd sector. Typically there is a delay time required before the read focus offset will be stable. In the process outlined above, this delay time overlaps with the reading of odd sectors, thus producing somewhat unstable read data. However, when the subsequent even frame is to be read, the read focus offset setting will have stabilized. Thus, data read in the even sectors is determined to be reliable and stable for purposes of evaluating the read focus offset. Based on the speed of electronics being used, the focus offset may also be stable while reading the odd sectors. Switching the focus offset only before reading the odd frames provides additional settling time to insure stability.

Following the second pass of reading the read focus data, the information is then processed and appropriately stored. In step 120, an average amplitude for each data sector is calculated using the stored amplitude data from the second reading pass. Using this calculated amplitude average for each sector, a variation level or difference level is then determined. More specifically, within each sector the average amplitude from the first read pass (or "base line" pass) is compared with the average amplitude from the second read pass (or variation pass). Using these average amplitude values, an amplitude difference for each data sector can be determined as shown in step 122. The calculation of an amplitude difference for the various sectors provides a read focus optimization method that is particularly fast and efficient. As seen, these difference values are developed using only two passes of the read/write head. Consequently, only two revolutions of the disk are necessary. Also, because the same data sectors are being compared, any variations due to media or data quality are inherently eliminated.

The amplitude difference values are then compared in step 124 and the sector with the largest amplitude difference is identified. Specifically, the system determines the sector number which has the largest positive amplitude difference. This sector is determined to be the optimum read focus sector. Based on this identification, the read focus offset used for that optimum sector is determined in step 126. This offset value will be stored in memory as part of the predetermined offset range. The sector with the largest positive amplitude difference is determined to be using the optimum read focus offset. Consequently, the read focus offset for the remaining read operations is set to the identified value and is subsequently used during the remaining read operations for the drive. The read focus optimization process 100 then ends at step 128 as the optimum offset has now been determined and can be used.

Figure 3:
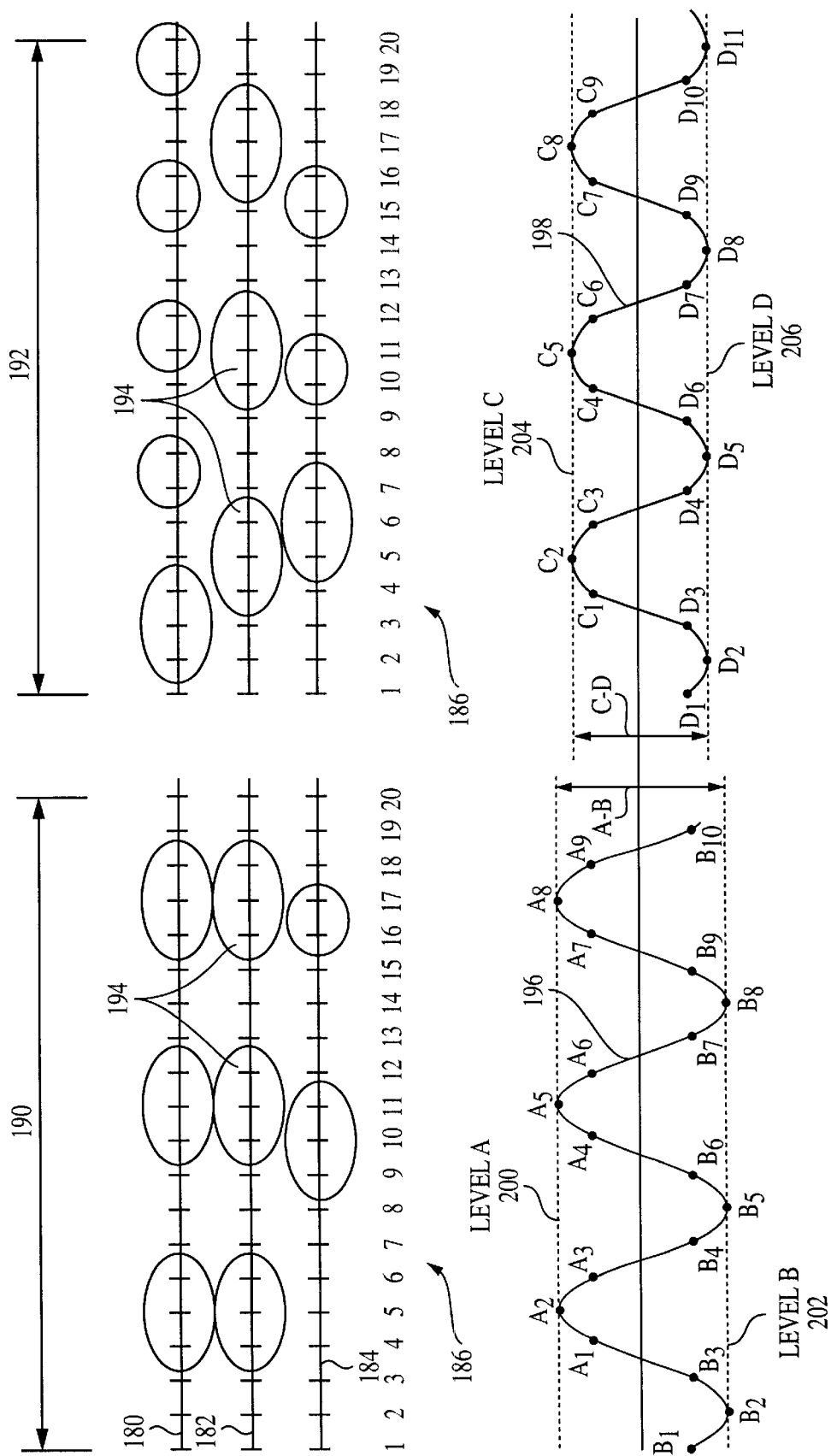
FIG. 3 is a conceptual drawing showing the predetermined data patterns used and the resulting readout signals.

Referring now to FIG. 3, there is shown a graphical representation of the actual data pattern used and the signal analysis of the present invention. In the preferred embodiment of the present invention, data is recorded in 1, 7 run-length-limited code (RLL 1, 7 Code). As is well known, this code contains several data patterns which can include the 2T pattern and the 3T pattern. The 2T pattern provides the highest frequency signal possible in this code. The 3T pattern (and other patterns) provide signals at a lower frequency but typically having a higher amplitude when read.

FIG. 3, shows three data tracks, a first data track 180, a second data track 182 and a third data track 184. As can be seen, first data track 180, second data track 182 and third data track already have a data pattern written thereon. Most importantly, a predetermined read focus data pattern (a 3T pattern) has been written on second track 182, while various random data patterns have been written in the first track 180 and the third track 184. The read focus data pattern will be sampled in order to perform the read focus optimization as outlined above.

FIG. 3 shows two segments of the predetermined data pattern—a first segment 190 and a second segment 192. These two segments are separated, so as to represent two separate data sectors. This also demonstrates the effects of varying the read focus offset. For reference, a specific clock reference 186 is marked for each segment. As can be seen, the 3T pattern is shown in both first segment 190 and second segment 192 on center track 182. The marks or spots 194 on center track 182 in first segment 190 are sized to cover three clock periods and are spaced three clock periods apart. Similarly, the marks 194 on second track 182 in second segment 192 are configured to cover three clock periods and are spaced three clock periods apart. These are well known characteristics of the 3T waveform.

When reading out this 3T pattern in the first segment 190, a very predictable waveform 196 is produced. At each clock period, the waveform is sampled, as indicated by the dots on waveform 196. Similarly, the waveform 198 produced in the second segment 192, is sampled, as indicated by the dots. From processing these waveforms, Level A 200, Level B 202, Level C 204 and Level D 208 are determined. As can be seen, data points $A_1, A_2 \ldots A_{12}$ provide the basis for determining Level A 200. Similarly, data point $B_1, B_2 \ldots B_{12}$ provide the basis for determined Level B 202. Likewise, data point $C_1, C_2 \ldots C_8$ provide any basis for determining Level C 204. Lastly, data point $D_1, D_2 \ldots D_8$ provide the basis for determining Level D 208.

As discussed above, the write offset data pattern is read twice, first without any offset variation and a second time with varied offsets for multiple sectors. Comparing the waveform 196 produced in first sector 190 and the waveform 198 produced in second sector 192, it can be seen that the peak values have changed. Waveform 196 has a peak to peak value of A–B, while waveform 198 has a peak to peak value of C–D. As outlined above, the difference between these two peak to peak amplitude values is exactly the value that is sought by the present invention. Using the specific waveforms shown in FIG. 3, this information would indicate that the read focus offset used to read data in segment 190 is more optimum than the offset used to read data in segment 192. Consequently, the offset used in segment 190 would be chosen as the more optimum read focus offset value.

Figure 4:
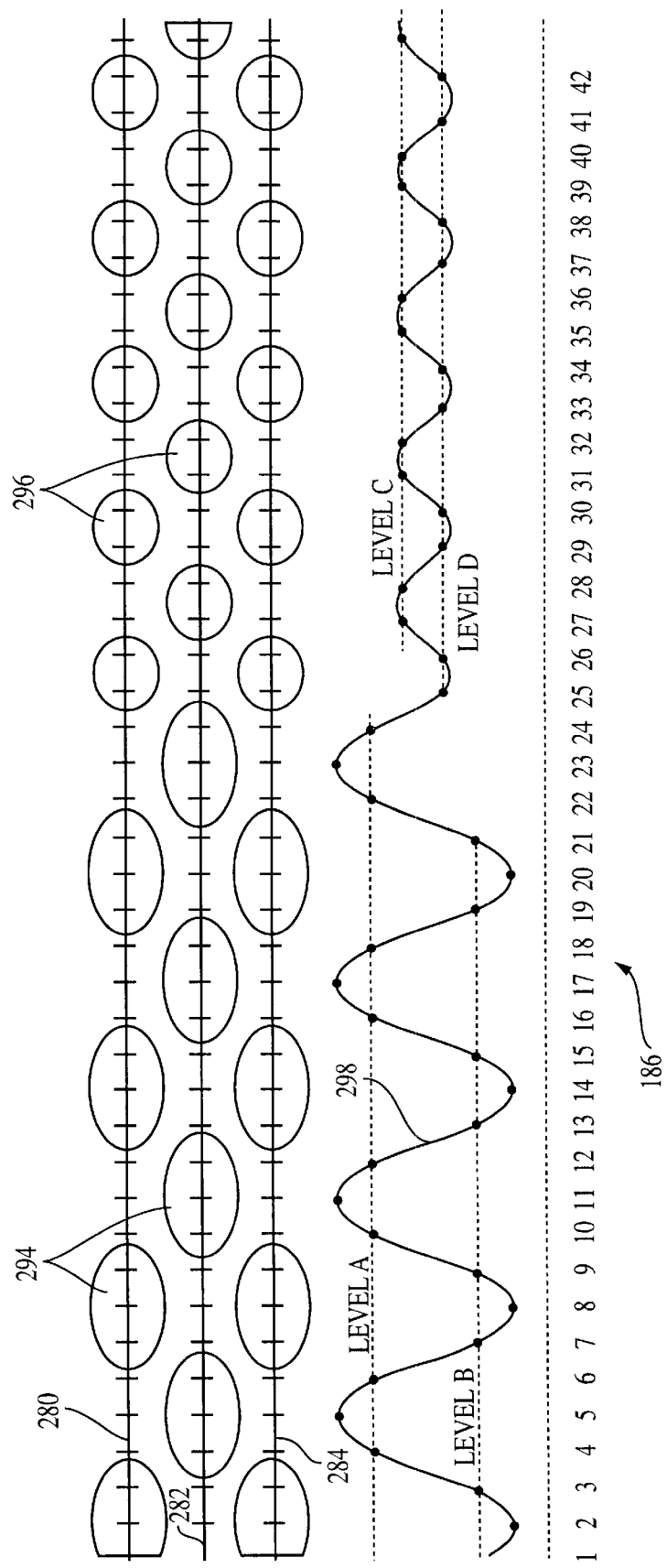
FIG. 4 is an additional conceptual drawing showing the use of an alternate predetermined data pattern.

Referring now to FIG. 4, there is shown an alternative drawing illustrating another data pattern which could be used in the read focus offset process. Again, a first data track 280, a second data track 282, and a third data track 284 are shown. Each of these data tracks are prewritten on the disk and have already been identified for use in read focus optimization processes. As outlined above, only second track 282 will be utilized in the actual read focus optimization processes, while first data track 280 and third data track 284 are specifically configured to produce crosstalk and interference (thus more closely simulating actual read operations). The specific data track shown in FIG. 4 create a worst case scenario due to the similarity in the three data tracks.

The data pattern shown in FIG. 4 includes both 3T and 2T components. As seen, a first mark or dot 294 is sized to cover three clock periods wherein a second mark 296 is sized to cover only two clock periods. While this data pattern is not necessary, it may well be used in other processes, such as write power calibration. Thus, it is oftentimes beneficial to use the same data pattern and thus minimize disk space used for these operations.

When reading out the data from center track 282, a very predictable wave form 298 is produced. As described above, this wave form can easily be analyzed to determine the optimum read focus offset for the particular drive. That is, this same data pattern could be read while altering the read focus offset. Since the data pattern will be consistent, comparisons can be easily made.

Figure 5:
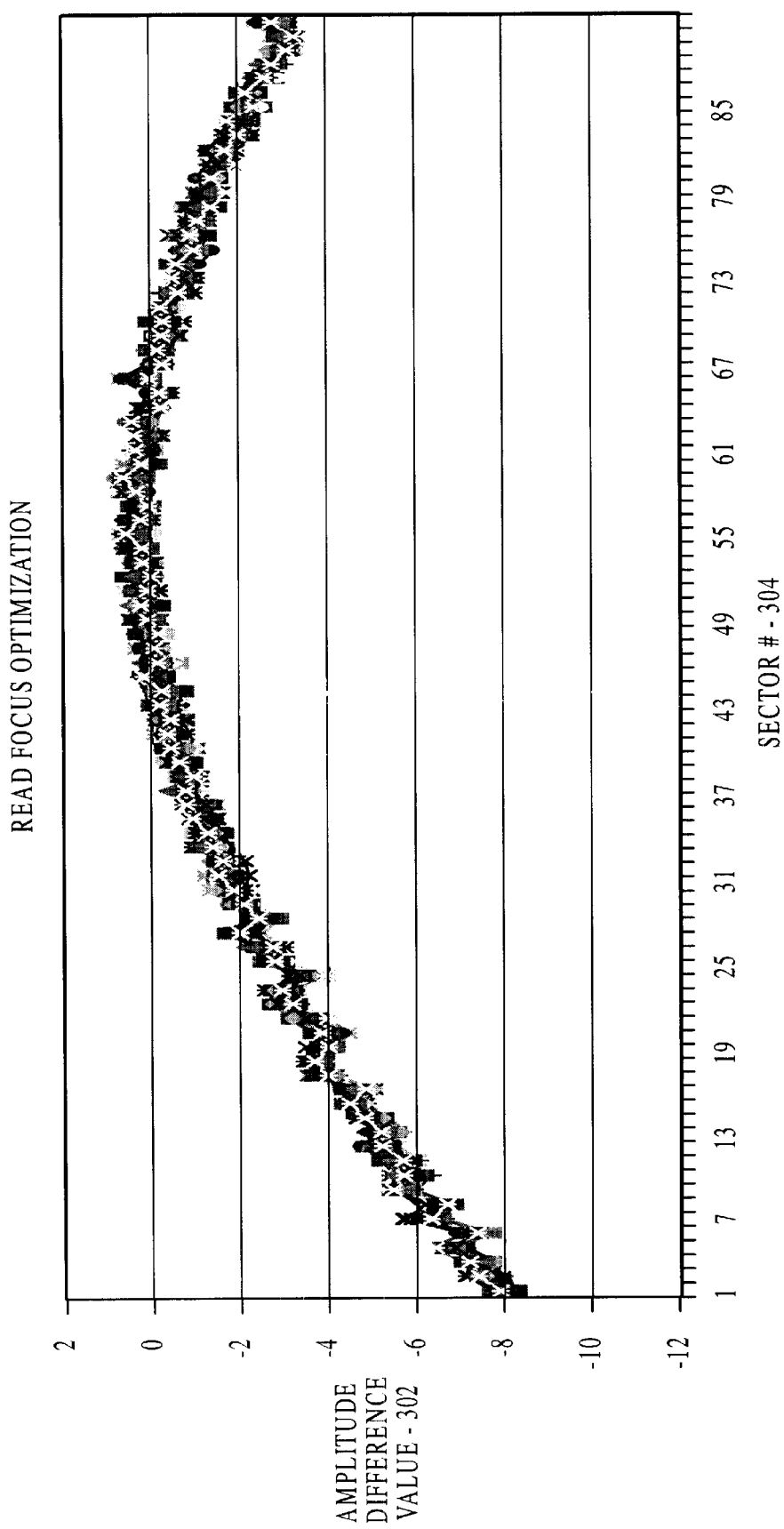
FIG. 5 is a graphical representation of the amplitude differences for various sectors when the read offset has been varied.

Lastly, shown in FIG. 5 is a data chart illustrating the results of the read focus optimization process. On this chart 300, the amplitude difference 302 is charted versus the sector number 304. Using this information, the data can be further processed using several data processing algorithms to determine which sector provides a maximum positive difference value. For example, this data can easily be processed using averaging techniques or curve fitting algorithms to determine a specific instance with the largest positive difference value. In this particular case, shown in FIG. 5, sector 48 has been identified as having the largest positive difference value. Thus the read focus offset used during reading this sector is determined to be the most optimum offset setting and will be used in all subsequent read operations.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A method of optimizing the read focus of an optical data storage system having a read focus control system, comprising:

storing a predetermined data pattern on an optical media at a predetermined location, wherein the predetermined data pattern includes a plurality of sectors;

reading at least one of the plurality of sectors while maintaining a focus offset for the focus control system constant;

calculating a baseline amplitude based upon the reading of at least one of the plurality of sectors while maintaining constant focus offset;

reading the predetermined data pattern from the plurality of sectors while varying the focus offset for each of the sectors and storing the resulting waveforms so that the varied focus offset is correlated to plurality of sectors;

determining an average amplitude value for the waveforms in each of the sectors; and determining which offset is optimum based on a comparison between the average amplitude value and the baseline amplitude.

2. The method of claim 1 wherein the step of reading at least one of the sectors further comprises reading the predetermined data pattern for all of the plurality of sectors while maintaining the focus offset constant and storing a resulting baseline waveform, so that the baseline waveform can be used to compute a baseline average amplitude value for all of the sectors based upon the baseline waveform, and comparing the baseline average amplitude with the average amplitude value to develop a difference value for each sector, wherein the optimum focus offset is determined by analyzing the difference values for each sector.

3. The method of claim 2 wherein each one of the plurality of data sectors contain an identical data pattern.

4. The method of claim 3 wherein the data pattern includes 2T and 3T components.

5. The method of claim 3 wherein the optical media is an optical storage disk and the predetermined location includes one test data track of the optical storage disk.

6. The method of claim 5 wherein the test data track is adjacent a first interference track, wherein the interference track is previously written to the optical storage disk.

7. The method of claim 6 wherein the data stored on the first interference track is identical to the data stored on the test data track.

8. The method of claim 7 wherein the data stored on the first interference track is offset from the test data track by a predetermined amount.

9. The method of claim 6 further including a second interference track adjacent the test data track and opposite the first interference track.

10. The method of claim 2 wherein the focus offset is varied between a maximum offset and a minimum offset.

11. The method of claim 2 wherein the predetermined criteria involves determining which focus offset produced the largest positive difference value.

12. A method for optimizing the read focus offset in an optical storage system which includes a predetermined optimization pattern written to a storage disk, comprising:

reading the optimization pattern while maintaining the read focus offset constant and storing a baseline amplitude signal;

reading the optimization pattern while varying the read focus offset and storing a resulting variable amplitude signal;

analyzing the baseline amplitude signal and the variable amplitude signal to produce a difference array indicative of the change in the amplitude signal caused by varying the offset; and analyzing the difference array to determine which amount of read focus offset produced the largest positive value in the difference array.

13. The method of claim 12 wherein the optimization pattern is sized to occupy one of a plurality of sectors on the disk, wherein the identical optimization pattern is written to a plurality of sectors.

14. The method of claim 13 wherein the optimization pattern includes 2T and 3T components.

15. The method of claim 13 wherein the plurality of sectors occupy one track of the storage disk.

16. The method of claim 15 wherein the track occupied by the plurality of sectors is surrounded by a plurality of interference tracks.

17. The method of claim 16 wherein the interference tracks contain a plurality of interference patterns which are identical to the optimization patterns.

18. The method of claim 17 wherein the interference patterns are offset from the optimization patterns.

19. The method of claim 12 wherein the read focus offset is varied between a maximum offset and a minimum offset.

20. An optimized data storage system capable of adjusting the read focus offset to provide optimum data reading capabilities, comprising:

a data storage media having a predetermined data pattern prewritten in a plurality of data sectors thereon;

a read mechanism associated with the storage media for reading data and producing a data output signal at a data output, the read mechanism having a focus offset system for introducing a focus offset into the read mechanism; and a controller attached to the read mechanism for receiving and analyzing the data output signal, the controller for further having a controller output attached to the read mechanism to control the focus offset system, wherein the controller initiates a first read pass wherein the predetermined data pattern is read while the focus offset is kept constant producing a baseline data set at the data output, and a second read pass wherein the focus offset is varied between a maximum offset and a minimum offset producing a varied data set at the data output, the controller for further analyzing the baseline data set and the varied data set to determine which focus offset produces an optimum data output signal.

21. The optimized data storage system of claim 20 wherein the data output signal is a non-decoded signal.

22. The optimized data storage system of claim 20 wherein the plurality of data sectors occupy a single track of the data storage media.

23. The optimized data storage system of claim 22 wherein each data sector contains the predetermined data pattern, and the predetermined data pattern includes 2T and 3T components.

24. The optimized data storage system of claim 20 wherein the data analysis includes the production of a difference data set by subtracting the baseline data from the varied data set.

* * * * *